United States Patent [19]

Curran

[11] 4,105,286
[45] Aug. 8, 1978

[54] BICYCLE REFLECTOR ASSEMBLY

[76] Inventor: Mike H. Curran, 1738 E. Montecito, Phoenix, Ariz. 85016

[21] Appl. No.: 762,888

[22] Filed: Jan. 27, 1977

[51] Int. Cl.² .............................................. G02B 5/12
[52] U.S. Cl. .................. 350/99; 280/289 R; 350/97
[58] Field of Search ............................. 350/99; 40/138; 301/37 SA, 37 R; 340/8, 25, 76; 240/7.55, 61.05, 51, 57, 49; D10/109–114; D48/32 R, 32 E; 280/89 R; 244/155 R

[56] References Cited

U.S. PATENT DOCUMENTS

| 1,798,052 | 3/1931 | Additon | 350/99 |
| 2,996,607 | 8/1961 | Witt | 240/49 |
| 3,309,661 | 3/1967 | Kennelly | 240/49 |
| 3,374,763 | 3/1968 | Browning | 350/99 |
| 3,528,721 | 9/1970 | La Londe | 350/99 |
| 3,578,840 | 5/1971 | Richards | 350/99 |
| 3,821,541 | 6/1974 | Burland | 240/49 |

FOREIGN PATENT DOCUMENTS 421,321  12/1934  United Kingdom .................. 350/99

Primary Examiner—John K. Corbin
Assistant Examiner—B. W. delos Reyes
Attorney, Agent, or Firm—Warren F. B. Lindsley

[57] ABSTRACT

A reflector assembly adapted for mounting on a moveable vehicle and employing a revolving reflector actuated by movement of the vehicle for flashing a warning signal to, among other things, approaching vehicles.

4 Claims, 6 Drawing Figures

BICYCLE REFLECTOR ASSEMBLY

BACKGROUND OF THE INVENTION

One of the more serious hazards encountered at night by drivers of automobiles and other vehicles is the danger of hitting riders of bicycles which are not properly lighted. This is especially true for city driving where other lights tend to compete with the relatively weak lighting normally provided on bicycles.

The problem is compounded by the many bicycles in violation of the law which requires bicycles to have the use light at night. More often than not, the lighting system of equipment bicycles will be inoperative because of spent batteries.

To provide at least a minimal degree of protection, most bicycles are equipped with stationary reflectors. While the protection provided by such reflectors is only marginal, something better is sorely needed.

The effectiveness of a reflector can be increased if it can be made to return a flashing light rather than a fixed or constant light beam. Such a flashing or pulsating light effect attracts more attention than a constant light beam and is thus capable of competing more effectively with other lights and various lighted objects.

DESCRIPTION OF THE PRIOR ART

A pivoting reflector is proposed by G. D. Parker in U.S. Pat. No. 2,741,948. His reflector is pivotally mounted at the side of the bicycle wheel. Pointed tabs extending from the reflector are engaged by the passing spokes of the wheel with the result that the reflector is rocked back and forth against a restraining spring and thus produces a flashing light reflection. This device is limited since it must be mounted relatively close to the ground, a position which is less than optimum for maximum visibility. Furthermore, the assembly projects from the side of the bicycle wheel where it is easily damaged by collision with objects of various types including the bars of bicycle racks.

F. G. La Londe in U.S. Pat. No. 3,528,721 discloses a pair of rotating reflectors which are mounted on the axle of a small wheel. The wheel rides on the top surface of the front or rear tire of the bicycle. As the bicycle wheel turns, the small wheel turns also causing the reflectors to rotate and return a flashing light. While the La Londe device achieves the desired effect, it is relatively cumbersome, utilizing exposed moving parts which can be easily entangled in the clothing of the bicycle rider and its use requires that the fender of the bicycle be removed.

In both cases, an important advantage is achieved over the fixed reflector, but better public acceptance can be realized if the noted disadvantages of the prior art can be eliminated.

SUMMARY OF THE INVENTION

In accordance with the invention claimed, an improved reflector is provided which returns a flashing reflected light for attracting the attention of approaching vehicles.

It is, therefore, one object of this invention to provide an improved reflector for vehicles, including bicycles.

Another object of this invention is to provide such an improved reflector assembly which will return a flashing or modulated light for effectively attracting the attention of oncoming vehicles.

A further object of this invention is to provide such a reflector in an enclosed assembly so that its moving parts are protected against weather, clothing entanglement, and destructive interference with other objects.

A still further object of this invention is to provide a relatively compact reflector assembly readily mountable on a bicycle.

A still further object of this invention is to provide a reflector assembly in a form permitting it to be driven from the side rather than from the top of a bicycle tire so that its mounting and use does not require the removal of a fender.

A still further object of this invention is to provide a flashing reflector assembly driven by air movement rather than a coupling to a revolving wheel.

Yet another object of the invention is to provide a revolving reflector assembly driven by a small d-c motor.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
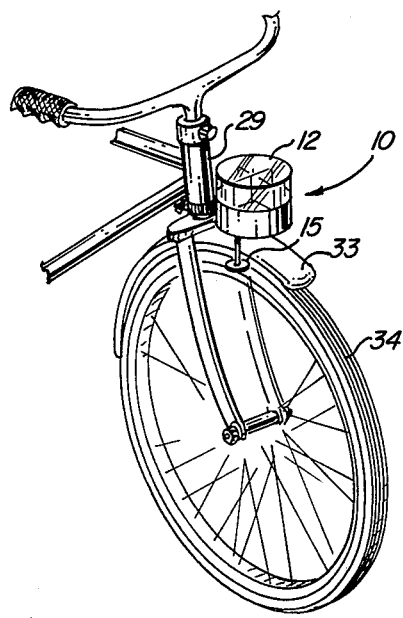
FIG. 1 is a perspective view of a reflector assembly embodying the invention mounted over the front wheel of a bicycle.
Figure 2:
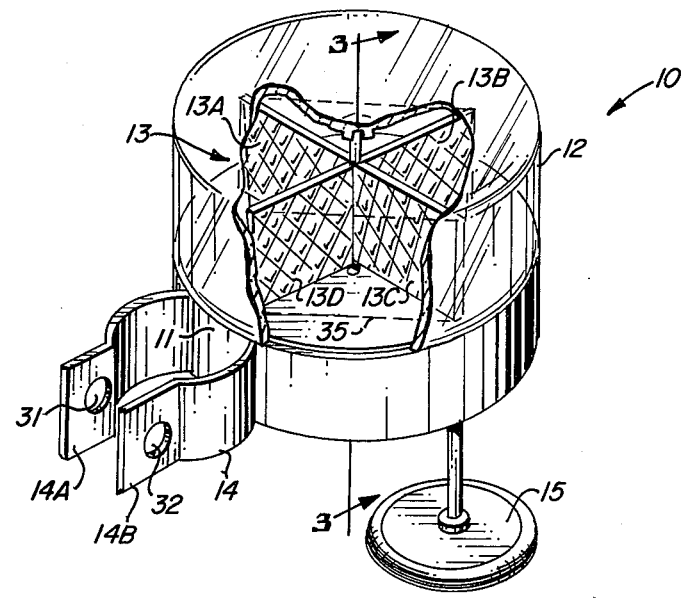
FIG. 2 is an enlarged perspective view of the reflector assembly shown in FIG. 1 with a part of the protective housing cut away to reveal details of its interior construction.
Figure 3:
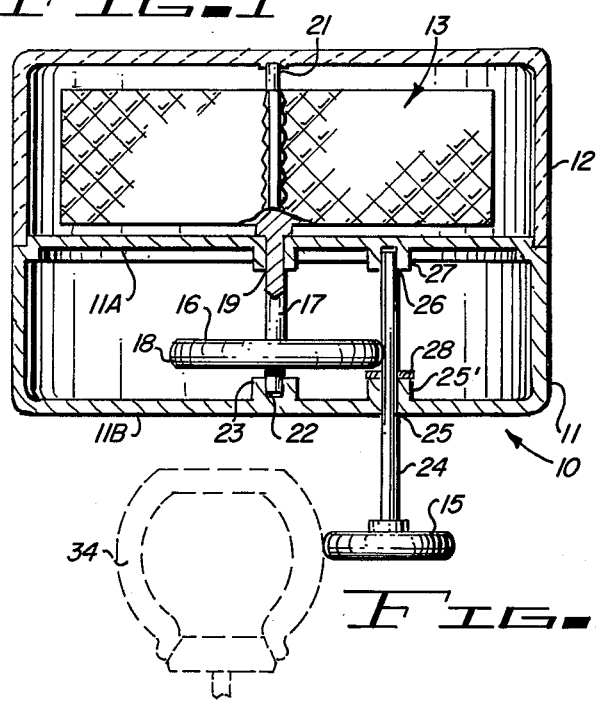
FIG. 3 is a cross-sectional view of FIG. 2 taken along line 3—3.

Referring more particularly to the drawing by characters of reference, FIGS. 1—3 disclose an improved reflector assembly 10 comprising a shallow cylindrical lower housing 11, transparent cylindrical upper housing 12, a paddle-wheel reflector 13 mounted within upper housing 12, a mounting bracket 14 of any desirable configuration, a pick-up wheel 15 and a reflector drive wheel 16. Upper housing 12 is closed at one end, taking the form of a transparent inverted cup.

Lower housing 11 is in the form of a short cylinder having a diameter three or four times its height. The axis of the cylindrical form of housing 11 is oriented vertically and both the upper and lower ends of housing 11 are closed by integral upper and lower circular plates 11A and 11B, respectively.

Reflector 13 may comprise two flat reflector panels which intersect at their centers to form the shape of a paddle wheel, each of the four paddles thus formed having a height which is approximately one-half its entended length. Each paddle may be reflective on either or both front and rear surfaces. The line of intersection of the two panels is oriented vertically and carries a vertical bore into which a vertical axle 17 is secured, the axle 17 extending a short distance above the top of wheel 13.

Drive wheel 16 is fixedly mounted to axle 17 near its lower end, as shown in FIG. 3, and has its peripheral surface 18 rubberized or otherwise treated so as to provide suitable friction against a metal surface. Alternatively, wheel 16 may be fitted with a rubber tire.

The assembly comprising the paddle-wheel reflector 13, and part of axle 17 is mounted inside housing 12 with drive wheel 16 positioned inside housing 11. Axle 17 passes through a reinforced hole 19 in the center of plate 11A with its upper end captured inside a small circular depression 21 in the center of the underside of the horizontal top covering of housing 12. The lower end of axle 17 is captured inside a circular depression 22 at the center of a circular projection 23 extending upwardly from the center of plate 11B. The hole 19 and the circular depressions 21 and 22 provide rotational mounting means for axle 17.

Drive wheel 15 is mounted at the lower end of an axle 24 which passes through a reinforced hole 25 in plate 11B into housing 11. The upper end of axle 24 is seated inside a circular depression 26 forming a bearing therefor at the center of a circular projection 27 which extends downwardly from the under surface of plate 11A into housing 11. An annular projection or fixed retaining ring 28 on axle 24 rides against the top surface of a flange 25 forming the reinforced hole 25, thus fixing axle 24 within housing 11.

The locations of hole 25 and depression 26 are such that axle 24 is vertically oriented and horizontally positioned as shown in FIG. 3 to effect the frictional engagement of the surface of axle 24 with the peripheral surface 18 of drive wheel 16.

It will not be apparent from FIG. 3 that as wheel 15 is rotated about its vertical axis, the frictional engagement between axle 24 and wheel 16 causes wheel 16 and its axle 17 to be rotated and therewith the paddle-wheel reflector 13. It should be recognized that reflector 13 may be directly driven by wheel 16 directly engaging the wheel of the vehicle, if so desired.

In use as a protective device for a bicycle, reflector 10 is mounted to the steering post 29 of a bicycle, as shown in FIG. 1, utilizing the mounting bracket 14. Bracket 14 is formed from a metal strip which may be shaped to wrap around the vertical cylindrical surfaces of lower housing 11, its ends extending outwardly to form two tabs 14A and 14B carrying aligned holes 31 and 32. The tabs 14A and 14B are appropriately spaced to receive the post 29 therebetween. A bolt is passed through the holes 31 and 32 behind the post 29 to complete the mounting of reflector 10. If desired, the tabs 14A and 14B may be shaped to conform to any other surfaces of post 29.

When reflector 10 is mounted in this way to the steering post 29 of a bicycle, it is positioned directly above the front fender 33 of the bicycle with the periphery of wheel 15 bearing against the side of a tire 34, as shown in FIGS. 1 and 3. Friction effected between wheel 15 and tire 34 causes rotation of paddle-wheel reflector 13 during rotation of tire 34 so that the rotating reflective surfaces of reflector 13 return any light beams received as a flashing light to on-coming traffic in accordance with the stated objects of the invention.

Housings 11 and 12 may be economically molded from suitable glass or plastic material with housing 12 formed from an inexpensive polystyrene or similar transparent plastic or glass composition.

With minor modifications and an appropriately designed bracket, the reflector 10 may also be adapted for mounting over the rear wheel of a bicycle to afford protection also against traffic approaching from the rear.

It will be apparent, of course, that modifications in the form of the reflective assembly 13 may be made without departing from the spirit of the invention. Thus, for example, four reflective panels may be arranged as the sides of a square box as suggested by the broken lines 35 in FIG. 2. The four panels may be mounted across the corners of the paddle-wheel reflector 13 or other mounting means may be employed.

Figure 4:
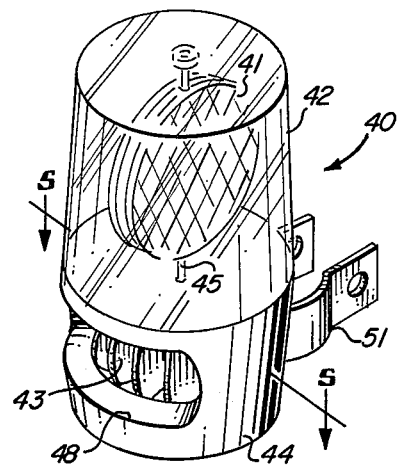
FIG. 4 is a perspective view of another embodiment of the invention.
Figure 5:
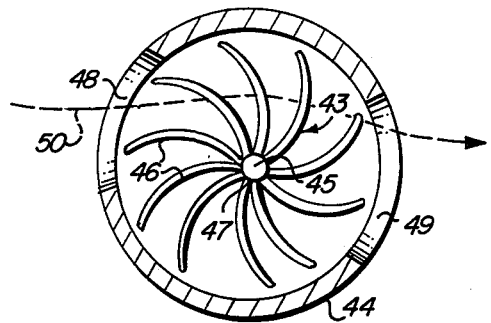
FIG. 5 is a cross-sectional view of FIG. 4 taken along line 5—5.

A second embodiment of the invention in the form of a wind-driven flashing reflector 40 is shown in FIGS. 4 and 5. Reflector 40 comprises a rotating reflector 41 enclosed within a transparent upper housing 42 and directly coupled to a fan 43 which is mounted inside a cowling or lower housing 44.

The reflector 40 is flat and circular with reflective surfaces on both sides and is mounted near the upper end of an axle 45 which passes between the front and rear reflective surfaces. The axle 45 passes downwardly through the top of cowling 44 and through the hub of fan 43.

Fan 43 comprises a number of curved blades 46 attached at one edge to a hub 47 which may be integral with axle 45.

The housings 42 and the cowling 44 are approximately cylindrical. Cowling 44 is closed, top and bottom. Housing 42 is closed on top and its open bottom fastens to the periphery of the top surface of cowling 44.

A first opening 48 at the front of cowling 44 and a second opening 49 at the rear permit the passage of an airstream 50 through fan 43 which causes the fan, as shown in FIG. 5, to be turned in a clockwise direction. The reflector 41 which is directly coupled to fan 43 by means of the common axle 45 is thus turned at the same rate and the revolving reflector 41 returns an incident light beam forming a flashing reflection.

A mounting bracket 51 similar to the bracket 14 of FIGS. 1-3 may be employed for the mounting of reflector 40 to a bicycle, motorcycle, speedboat or other vehicle.

While the embodiment of FIGS. 4 and 5 is best adapted to relatively high-speed applications where the rush of air is at a sufficiently high velocity, it may also be applied for use on bicycles if bearing resistances can be held sufficiently low.

Figure 6:
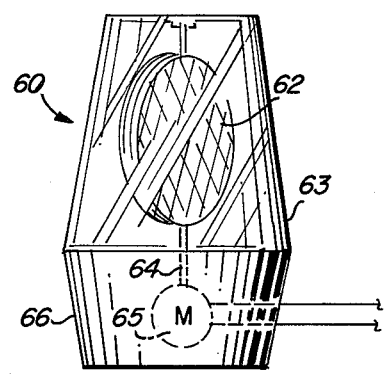
FIG. 6 is a perspective view of a further embodiment of the invention.

In FIG. 6 yet another embodiment of the invention is shown which is similar in form to the embodiment of FIGS. 4 and 5 except that fan 43 is replaced as the driving element by an electric motor. FIG. 6 shows a flashing reflector assembly 60 comprising a rotating reflector 62 enclosed within a transparent upper housing 63 and coupled by means of a common axle 64 to a d-c motor 65 which is enclosed within a lower housing 66. Both housings 63 and 66 are shown in the forms of conical sections, but cylindrical or other forms may be utilized. The reflector 60 is best utilized on motorized vehicles which are equipped with batteries in which case the available energy source for driving motor 65 is assured.

An effective and economical means for assuring the visibility of bicycles and other small vehicles in conditions of darkness is thus provided in accordance with the stated objects of the invention. Although but a few embodiments of the invention have been illustrated and described, it will be apparent to those skilled in the art that various changes and modifications may be made therein without departing from the spirit of the invention or from the scope of the appended claims.

What is claimed is:

1. A reflector assembly for a vehicle comprising in combination:

a tubular housing having a transparent portion which is arranged to contain within said portion a rotatively mounted reflector, means for securing said housing to a vehicle, a reflector rotatively mounted on a shaft arranged in at least one bearing within said housing, said shaft being substantially vertically positioned when mounted on the vehicle, and means connected to said shaft for causing it and the associated reflector's rotation upon actuation thereof, said means causing said shaft and associated reflector's rotation comprising a wheel means engageable with a wheel of the vehicle and rotative thereby, said reflector comprises an open-ended structure pivotally rotatable with said shaft about its axis and comprising side plane surfaces which are exposed sequentially to light rays directed thereto for reflection thereof.

2. The reflector assembly set forth in claim 1 wherein: said transparent portion is detachably connected to said housing.

3. The reflector assembly set forth in claim 1 wherein: said means causing said shaft and associated reflector's rotation comprises a first wheel means mounted on said shaft, a second shaft parallelly from said first shaft and rotatively mounted in bearings in said housing, and second wheel means mounted on said second shaft for rotation therewith, said second wheel means engageable with the side wall of the tire of a bicycle for rotation thereby upon movement of the bicycle.

4. The reflector assembly set forth in claim 1 wherein: said reflector comprises four side panels each having reflective surfaces on the exposed sides thereof, each of said panels being fixedly mounted on said shaft at 90° angles of each other.

* * * * *